UNITED STATES PATENT OFFICE.

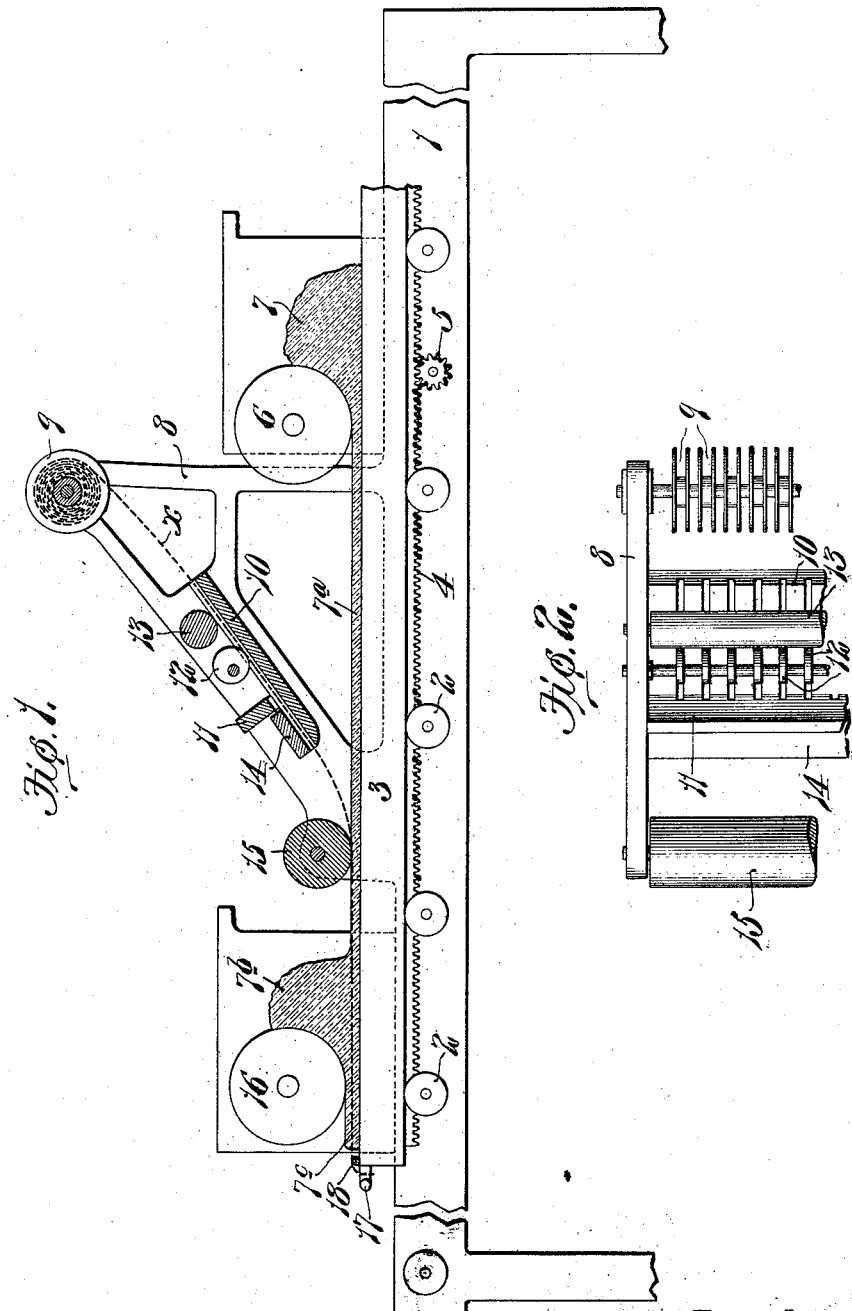

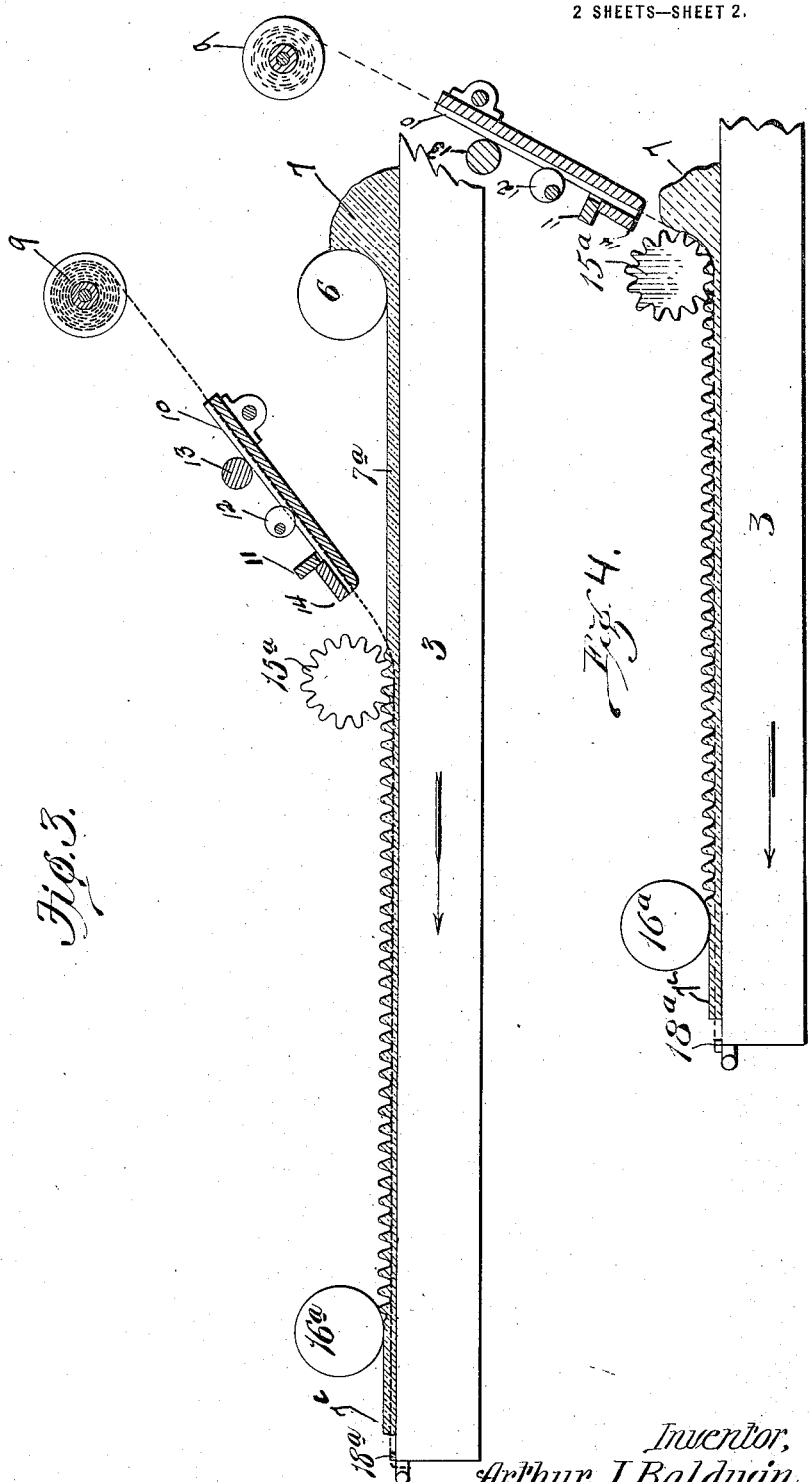

ARTHUR J. BALDWIN, OF EAST ORANGE, NEW JERSEY, ASSIGNOR TO MISSISSIPPI WIRE GLASS COMPANY, OF NEW YORK, N. Y., A CORPORATION OF NEW JERSEY.

SINGLE-STRAND-WIRE-GLASS MACHINE.

1,144,976.    Specification of Letters Patent.    Patented June 29, 1915.

Application filed December 21, 1908. Serial No. 468,508.

*To all whom it may concern:*

Be it known that I, ARTHUR J. BALDWIN, a citizen of the United States, residing at East Orange, New Jersey, have invented a certain new and useful Improvement in Single-Strand-Wire-Glass Machines, of which the following is a full, clear, and exact description, such as will enable others skilled in the art to which it appertains to make and use the same, reference being had to the accompanying drawings, forming part of this specification, in which—

Figure 1 is a longitudinal vertical sectional view of my improved machine: Fig. 2 is a fragmentary plan view; Fig. 3 is a modified form; Fig. 4 shows a modified form.

This invention relates to a new and useful improvement in single strand wire glass machines. By "single strand" I mean that instead of embedding a wire mesh into the sheet of glass, as has heretofore been largely practised, I propose to embed one or more single strands of wire into the sheet of glass, said strands being so arranged with respect to each other that they are electrically insulated from each other, the ends of the wires preferably projecting beyond the sheet of glass to afford means for electrically connecting said wires together, as illustrated in an accompanying application filed by me of even date and serially numbered 468,508.

The single strand sheets of glass made by my improved machine and according to my method are useful for various purposes, among which may be mentioned dust and wind guards for automobiles, vault and jail lights, show cases, etc., where the electric burglar alarm element is valuable, and other places where it is desired to have single strands of wire instead of wire mesh as has heretofore been used.

My present invention consists in a machine for and method of manufacturing single strand wire glass, as will hereinafter be set forth and afterward pointed out in the claim.

In the drawings, 1 indicates a frame on which are arranged rollers 2 for supporting a table 3.

4 is a rack on the under side of the table which meshes with a driving pinion 5 whereby the table may be moved over the rollers.

6 is an initial spreading roller appropriately mounted on the frame 1, or an extension thereof, which roller initially spreads the pour 7 of molten glass into sheet form as indicated at 7$^a$.

8 is an extension of frame 1 for supporting the single strands of wire and their friction devices.

9 are a series of bobbins or spools loosely arranged on a suitable cross-shaft and each containing a strand of wire of appropriate gage.

10 is a plate slotted for the passage of the several strands of wire.

11 is a bar having recesses or slots registering with the grooves or slots in the plate 10 and forming a guiding opening through which the strands of wire pass.

12 are eccentrics working in the slots or grooves in the plate 10, and whose function is to keep the single strands of wire more or less taut during the operation of the machine.

13 is a roller under which the wires pass in entering the grooves in plate 10.

14 is a flat bar arranged at the lower end of plate 10, said bar serving to confine the wires in grooves in said plate 10.

15 is the embedding roller which, in this case, is smooth, and under which the single strands of wire pass, said wires being embedded in the top surface of the sheet 7$^a$.

16 is a finishing roller mounted in the said frame 1, or an extension thereof, for spreading the second pour 7$^b$ of glass in sheet form over the single strands of wire and making the complete sheet of glass 7$^c$.

In operation the pour 7 is dumped onto the front end of table 3 and said table advances until the ends of the wire X are in position to be clamped by a clamping device 17 over a spacing bar 18 on the forward end of table 3. After the ends of the single strands of wire are secured in position at the forward end of the table, the table is further advanced and the second pour 7$^b$ made, after which the table is moved forward until the pours of glass are spread. The wires are then severed and the complete sheet of glass annealed in the usual way.

In Fig. 3 I have shown a modified form of my invention, in which, instead of embedding single strands of wire onto the surface of the first formed sheet of glass 7$^a$ by means of a smooth embedding roller, I use a longitudinally fluted embedding roller 15$^a$ which forces the single strands of wire deeply into the surface of the sheet 7ª, leaving transversely disposed ribs or corrugations on said sheet as shown. These may be smoothed by a finishing roller 16ª, or a second pour can be employed as heretofore described.

It will be obvious that the initial roller 6 can be dispensed with and the first pour 7 spread out by the rollers 15 or 15ª, in which event the strands of wire could be fed from in front and around the rollers 15 and 15ª.

The feature of placing an independently operable and individual tension on the several strands, I deem quite important because the wire fed to the molten glass is usually of normal temperature and naturally becomes heated and expands. This expansion is not uniform in all the strands of wire. Where a number of strands are being fed to the glass, there might be as many different degrees of expansion as there are different wires, and unless some individual means were provided to take up the slack caused by these various expansions some of the strands would be comparatively taut, while the others would be slack, which slackness causes them to buckle and possibly spoil the glass. Individual tension on each strand of wire avoids the likelihood of any of the strands being slack and tends to insure all the strands being fed into the machine with the slack taken up.

I claim:—

In a device for manufacturing wire glass, the combination of forming rolls, wire reels for supporting separate strands of wire, a table, a slotted guide plate for guiding the separate strands of wire from said reels to said table, and adjustable friction elements coöperating with said slotted plate to grip the wires individually to apply selectively variable tension to the different wires.

In testimony whereof I hereunto affix my signature in the presence of two witnesses, this 17th day of December 1908.

ARTHUR J. BALDWIN.

Witnesses:
EDWARD T. MAGOFFIN,
PHILIP S. HILL.